Sept. 19, 1944.   G. ORNSTEIN   2,358,587
DOSING DEVICE FOR GASES
Filed June 29, 1940

INVENTOR
Georg Ornstein

Patented Sept. 19, 1944

2,358,587

UNITED STATES PATENT OFFICE 2,358,587

DOSING DEVICE FOR GASES

Georg Ornstein, New York, N. Y.

Application June 29, 1940, Serial No. 343,076
In Germany February 3, 1940

4 Claims. (Cl. 230—69)

My invention relates to improvements in devices for dosing gaseous chemicals, particularly gases.

In various technical fields, for instance in the sterilization and purification of water and sewage, in bleaching in the textile and pulp industry, in the cleaning of bottles, barrels and containers in breweries and dairies, the reliable dosing of quantities of gases is of great importance. For the purposes mentioned, for instance chlorine, sulfurdioxide, ammonia etc. or their aqueous solutions are employed. The difficulty of dosing a gas increases, the smaller the gas quantities to be applied or the more aggressive the gases are and the more exacting the accuracies required become.

There exist already various devices for dosing of gases, but they are complicated and expensive and not always reliable in operation. This is particularly the case, if the gases to be dosed are aggressive.

One object of the invention consists in a gas dosing device which is as simple and reliable in operation as possible and permits an exact regulation even of an aggressive gas.

Another object of the invention is a device in which the gases to be dosed are subjected to hydraulic influences only, namely by employing a liquid as operating medium for the dosing device thus applying the displacement principle.

A dosing device according to the invention consists in principle of a vessel closed on all sides which is connected with a source of gas through a shut-off device preventing back flow of the gas to its source and which is equipped with devices for a continuing or intermittent feed of the vessel with liquid, with automatic devices for intermittently removing the liquid from the vessel and with automatic devices for intermittently removing gas or a gas-liquid solution.

The operation of a device according to the invention is briefly as follows: By removing the liquid from the vessel gas is aspirated from its source and the vessel is filled with gas. The aspiration of gas ends when the liquid has been removed from the vessel; during the next refilling of the vessel with liquid the previously aspirated quantity of gas is pressed out of the vessel and conducted to the point of application. While the removal of the liquid from the vessel is intermittent, the feeding of liquid to the vessel is preferably continuous. It may, however, also be intermittent. By increasing or decreasing the rate of flow of the liquid to the vessel the time interval between the individual gas dosages can be reduced or increased whereby the capacity of the device per time unit can be regulated. The invention will be explained more in detail in connection with the drawing in which three embodiments of a device according to the invention are shown.

Fig. 1 shows schematically an embodiment of the invention.

Fig. 2 shows a second embodiment of a part of a device according to the invention, and Fig. 3 shows another embodiment of a detail of a device according to the invention.

In the device shown in Fig. 1, which is suitable for instance for the dosing of chlorine in a small water purification plant, chlorine gas is conducted from a chlorine cylinder, not shown, through a conventional float valve 1 to a bell jar 2. The bell jar, preferably made of glass, is standing in a tray 3 filled for instance with water or a salt solution and is provided with suitable accessory equipment not shown, for instance a float valve for the water flowing into tray 3 or an overflow, for maintaining the water in tray 3 at a predetermined level. This necessary equipment is not described in detail since it may be conventional. Bell jar 2 is connected with a closed vessel 5 by a pipe 4. Vessel 5 contains some sealing liquid, for instance water or salt solution, into which pipe 4 dips. From the upper part of vessel 5 a pipe 6 leads to a second closed vessel 7, the metering vessel of the device. Vessel 7 is connected with a pipe 8 through which a liquid may be admitted to the vessel. The pipe may discharge at a suitable point, for instance at the top or bottom of vessel 7. Vessel 7 contains a syphon 9, through which the admitted liquid can be discharged after reaching a maximum level. A pipe 10 which is connected with vessel 7 at a point above the maximum level of the liquid serves to discharge the admitted gas. Pipe 10 ends in a sealing liquid within a vessel 11, from the upper part of which the chlorine gas may flow through a discharge pipe 12 to the point desired for instance to an absorption tower 13.

The device according to the invention operates as follows: Liquid is discharged into vessel 7 through pipe 8. As soon as the liquid level in vessel 7 has reached the top of syphon 9, the syphon will automatically begin to discharge. The outflowing liquid creates a negative pressure in vessel 7, which causes chlorine gas to be aspirated from vessel 5 as long as liquid is discharged from vessel 7. The discharge pipe 10 leading to vessel 11 is meanwhile closed by the liquid seal formed in and by vessel 11, whereas the seal formed in and by vessel 5 permits the flow of gas in the direction from the gas supply to vessel 7. When the liquid in vessel 7 reaches a level at which syphon 9 ceases to operate, the refilling of vessel 7 commences by the liquid flowing in through pipe 8. During the refilling the aspirated chlorine is pressed out of vessel 7 through pipe 10 into vessel 11 and then through pipe 12 into absorption tower 13, the seal in vessel 11 being open in this direction. A backflow of chlorine gas into vessel 5 and pipe 4 is not possible since the liquid seal in vessel 5 will prevent a flow of gas in this direction.

The chlorine entering at the bottom of absorption tower 13 is dissolved by a regulated current of water entering at the top through pipe 14 and the formed solution is conducted to the point of application by the discharge pipe 15 either by gravity or by any suitable known means.

The device according to the invention is based on the principle of a pump. The liquid entering at 8 represents the operating power, vessel 7 with its individual parts the pump proper, the parts 4 to 6 the suction valve and the parts 10 to 12 the pressure valve. The quantity of chlorine which is pumped at each stroke is determined by the capacity of vessel 7 between minimum and maximum liquid level, as controlled by the range of the syphon. The minute pressure differences during the aspiration and the discharge of the chlorine, which usually amount only to a few centimeters of water column can mostly be neglected. However, these pressure differences may be taken in consideration by a simple empirical calibration.

The inflow of liquid into vessel 7 through pipe 8 may be regulated at will by hand or by automatic devices of known design, for example by a valve 26 included in pipe 8 and may thereby be adapted to certain conditions, for instance to the quantity of water to be purified, to the degree of pollution of water and the chlorine demand caused thereby.

Water is suitably used as operating liquid for the device which liquid may afterwards be employed for feeding the absorption tower. Other operating liquids may be used, for instance concentrated sulfuric acid, salt solutions, etc. In such case a circulation of the operating liquid is preferable.

In the same or a similar way other gases may be dosed for the same or any other purposes, for instance ammonia; other operating liquids, for instance kerosene oil or mercury, may be employed. However these are not suitable in connection with chlorine, because they react with it. In each case the arrangements are to be adapted to the specific properties of the gas used.

Instead of using a syphon another similarly acting device, for instance a tilting trough, a bucket wheel or mechanically operated, periodically working liquid displacement devices etc. may be employed. The device according to Fig. 1 can be simplified by placing the two vessels 5 and 11 under the bell jar 2 and by using the liquid in tray 3 as sealing liquid. Such an arrangement eliminates simultaneously the necessity of an occasional replacement of possibly evaporated sealing liquid in vessels 5 and 11. In a similar manner vessels 5 and 11 may be combined with vessel 7 or absorption tower 13.

In the embodiment shown in Fig. 2 the admission of operating liquid is regulated by means of a tilting trough 16. This tilting trough 16 can pivot around the axle 19 and is arranged within a funnel 20. By means of a pipe 16 and a control valve 17 a regulated quantity of liquid can be discharged into the trough. If one half of tilting trough 18 is filled, it tips over and empties the contents of this half into funnel 20, while the other half of the tilting trough, now being beneath pipe 16, is filled. The liquid flowing through funnel 20 will flow into vessel 21. The capacity of each half of the tilting trough is preferably so dimensioned, that its contents will fill vessel 21 just a little above the top of a syphon 22. Consequently the syphon will begin to operate after the addition of the contents of one half of the tilting trough and thus again empty vessel 21.

During the emptying of vessel 21 gas is aspirated into vessel 21 through a feedline 23 corresponding to feedline 6 of Fig. 1, and pressed out again through a discharge 24 corresponding to discharge line 10 of Fig. 1 during the refilling of vessel 21 with liquid.

In Fig. 3 a simplified embodiment of syphon 27 for a device according to the invention is shown which can be preferably used instead of the syphon shown in Fig. 1 and with similar embodiments within the scope of the invention. Syphon 27 comprises a tube 29 which is open at or near the bottom and closed at the top so that its interior may freely communicate with the liquid admitted into vessel 7 through pipe 8 by means of leg-like projections at the bottom openings in the side walls, etc. Inside of tube 29 a discharge tube 30 is provided consisting of a vertical tube, part 31 of which, for instance the upper end, is bent downward for a certain preferably only short distance and which is adjustable in vertical direction. The top of the syphon is formed by the top of this tube 30. Consequently by moving tube 30 in vertical direction the gas capacity of vessel 25 can be varied within a large range and thereby the aspirated quantity of gas regulated. A further possibility of regulation consists in regulating the rate of flow of the admitted liquid, which can be easily done. The bend 31 at the top of discharge tube which may have any other suitable form together with the liquid rising within tube 29 forms a liquid seal as soon as the liquid reaches the opening of tube 30. In the upper part of tube 29 a certain volume of gas will be imprisoned when the liquid closes tube 30. This gas will be compressed when the liquid continues to rise until it reaches the top of the syphon thus forming a gas cushion. As soon as the top is reached by the liquid the syphon begins to discharge. The elasticity of the gas cushion has a very favorable influence upon the reliable discharge action of the syphon independent of the rate of flow of the liquid, so that thereby a further possibility of regulating the aspirated gas quantity within wide limits is provided. The inventor has found that under otherwise equal operating conditions, the limits of the rate of flow within which a syphon without the bend 31 discharges reliably hardly exceeded a proportion of 1:3 between the maximum and the minimum and that by providing bend 31 a proportion of 1:16 could be obtained without investigating whether this represented the extreme limits. The reason is that due to the cushion effect the liquid level near the discharge point oscillates somewhat. As a result thereof the syphon does not trickle but begins abruptly to discharge.

Syphon 27 is preferably arranged to drain vessel 7 as quickly as possible.

What I claim as new and desire to secure by Letters Patent is as follows:

1. Apparatus for dosing gas comprising a closed vessel, means for discharging a liquid into said vessel, means for regulating the quantity of liquid discharged into said vessel, a syphon provided within said vessel for intermittently draining said vessel within the range of volume controlled by said syphon, a supply of gas, a conduit for admitting gas from said supply of gas to said vessel, a seal of liquid included in said supply conduit permitting the flow of gas only in the direction from said supply of gas to said vessel, a second conduit connected with said vessel for discharging gas from said vessel and a seal of liquid included in said discharge conduit permitting the flow of gas only in the direction from said vessel through said discharge conduit.

2. Apparatus for dosing gas comprising a closed vessel, means for discharging a liquid into said vessel, means for regulating the rate of flow of liquid discharged into said vessel, a supply of gas, a conduit for admitting gas from said supply of gas into said vessel, a seal of liquid included in said supply conduit permitting the flow of gas only in the direction from said supply of gas to said vessel, a second conduit connected with said vessel for discharging gas from said vessel, a seal of liquid included in said discharge conduit permitting the flow of gas only in the direction from said vessel through said discharge conduit, a syphon provided within said vessel for intermittently draining said vessel within the range of volume controlled by said syphon, said syphon comprising a container closed at the top and communicating at the bottom with the liquid within said vessel and a conduit for discharging liquid from said vessel extended into said container, said conduit forming the discharge leg of said syphon, whereby a certain quantity of gas is sucked into said vessel through said first conduit during each draining and pressed out through said second conduit during each refilling.

3. Apparatus for dosing gas comprising a closed vessel, means for discharging liquid into said vessel, means for regulating the rate of flow of liquid discharged into said vessel, a supply of gas, a conduit for admitting gas from said supply of gas to said vessel, a seal of liquid included in said supply conduit permitting the flow of gas only in the direction from said supply of gas to said vessel, a second conduit connected with said vessel for discharging gas from said vessel, a seal of liquid included in said discharge conduit permitting the flow of gas only in the direction from said vessel through said discharge conduit, a syphon provided within said vessel for intermittently draining said vessel within the range of volume controlled by said syphon, said syphon comprising a tubular container closed at the top and communicating at the bottom with the liquid within said vessel and a discharge conduit for discharging liquid from said vessel extended into said tubular container said conduit including a downward bent section and forming the discharge leg of said syphon, whereby a certain quantity of gas is sucked into said vessel through said supply conduit during each draining and pressed out through said withdrawal conduit during each refilling.

4. Apparatus for dosing gas comprising a closed vessel, means for discharging liquid into said vessel, means for regulating the rate of flow of liquid discharged into said vessel, a supply of gas, a conduit for admitting gas from said supply of gas to said vessel, a seal of liquid included in said supply conduit permitting the flow of gas only in the direction from said supply of gas to said vessel, a second conduit connected with said vessel for discharging gas from said vessel, a seal of liquid included in said discharge conduit permitting the flow of gas only in the direction from said vessel through said discharge conduit, a syphon provided within said vessel for intermittently draining said vessel within the range of volume controlled by said syphon, said syphon comprising a tubular container closed at the top and communicating at the bottom with the liquid within said vessel and a discharge conduit for discharging liquid from said vessel extended into said tubular container, said conduit including a downward bend section and forming the discharge leg of said syphon, means for adjusting the effective length of said discharge conduit within said tubular container, whereby a certain quantity of gas is sucked into said vessel through said supply conduit during each draining and pressed out through said withdrawal conduit during each refilling.

GEORG ORNSTEIN.